(12) United States Patent
Wheat et al.

(10) Patent No.: US 8,426,071 B2
(45) Date of Patent: Apr. 23, 2013

(54) METHOD AND APPARATUS FOR SEPARATING LIQUID FROM A GAS STREAM

(75) Inventors: William Spencer Wheat, Missouri City, TX (US); David Wayne Harrison, Sr., Houston, TX (US); Daniel G. Casey, Kingwood, TX (US); Kerry Kennedy Spilker, Houston, TX (US)

(73) Assignee: Texaco Inc, San Ramon, CA (US)

( * ) Notice: Subject to any disclaimer, the term of this patent is extended or adjusted under 35 U.S.C. 154(b) by 506 days.

(21) Appl. No.: 11/752,758

(22) Filed: May 23, 2007

(65) Prior Publication Data
US 2008/0057362 A1 Mar. 6, 2008

Related U.S. Application Data

(63) Continuation of application No. 10/408,035, filed on Apr. 4, 2003, now abandoned.

(51) Int. Cl.
*H01M 8/06* (2006.01)
*B01D 45/12* (2006.01)

(52) U.S. Cl.
USPC ............................ 429/411; 429/423; 55/459.1

(58) Field of Classification Search ............... 55/421, 55/459.1; 429/19, 20, 411, 423; 73/305
See application file for complete search history.

(56) References Cited

U.S. PATENT DOCUMENTS

| | | |
|---|---|---|
| 2,767,586 A | 10/1956 | Jancosek et al. |
| 2,849,079 A | 8/1958 | Evans |
| 3,224,173 A | 12/1965 | Webb |
| 3,276,188 A | 10/1966 | Carlson |
| 3,669,857 A | 6/1972 | Kirkham et al. |
| 4,037,024 A | 7/1977 | Landau |
| 4,373,941 A | 2/1983 | Lagelbauer |
| 4,596,586 A | 6/1986 | Davies et al. |

(Continued)

FOREIGN PATENT DOCUMENTS

| | | |
|---|---|---|
| CA | 2339587 | 11/2001 |
| DE | 641877 | 2/1937 |
| EP | 1207132 | 5/2002 |

*Primary Examiner* — Stephen J. Kalafut
(74) *Attorney, Agent, or Firm* — Melissa Patangia; Christopher D. Northcutt; Gregory L Porter, Andrews Kurth LLP (57) ABSTRACT

An apparatus for separating liquid from a gas stream. The apparatus includes an elongated housing having a cylindrical inner surface and a gas stream inlet that is tangential to the side wall of the housing so as to cause the entering gas stream to swirl within the housing. A gas stream outlet is located at the top of the housing and a liquid outlet at the bottom. The gas stream outlet can include an elongated tubular member that extends into the housing and has an opening that is located below the housing gas stream inlet. Liquid components of the gas stream separate from the stream under the influence of centrifugal forces that are created by the swirling flow path of the stream within the housing. A liquid outlet and liquid outlet valve are provided for maintaining a minimum level of liquid within the housing so as to maintain a liquid seal within the housing. A level indicator may optionally be provided to monitor the liquid level within the housing. A power generation apparatus having two or more of the separators for separating liquid from fuel cell and fuel processor streams. Methods for manufacturing an apparatus for removing liquid from a gas stream and methods for separating liquid from a gas stream are also provided.

15 Claims, 2 Drawing Sheets

U.S. PATENT DOCUMENTS

| | | | |
|---|---|---|---|
| 4,908,049 A | 3/1990 | Yoshida et al. | |
| 5,200,279 A | 4/1993 | Draper et al. | |
| 5,218,832 A | 6/1993 | Woolley | |
| 5,250,091 A | 10/1993 | Nigsch et al. | |
| 5,360,679 A | 11/1994 | Buswell et al. | |
| 5,366,818 A | 11/1994 | Wilkinson | |
| 5,635,068 A | 6/1997 | Marandi | |
| 5,643,470 A | 7/1997 | Amini | |
| 5,683,575 A | 11/1997 | Yates et al. | |
| 5,989,318 A | 11/1999 | Schroll | |
| 6,077,620 A | 6/2000 | Pettit | |
| 6,228,146 B1 | 5/2001 | Kuespert | |
| 6,232,005 B1 | 5/2001 | Pettit | |
| 6,242,119 B1 | 6/2001 | Komura et al. | |
| 6,302,164 B1 | 10/2001 | Nitecki et al. | |
| 6,342,197 B1 | 1/2002 | Senetar | |
| 6,376,113 B1 | 4/2002 | Edlund | |
| 6,432,568 B1 | 8/2002 | Salvador | |
| 6,475,256 B2 | 11/2002 | Matsubara et al. | |
| 6,485,854 B1 | 11/2002 | Grover et al. | |
| 6,574,986 B2 | 6/2003 | Morimoto et al. | |
| 6,670,058 B2 * | 12/2003 | Muradov | 429/412 |
| 7,011,903 B2 * | 3/2006 | Benson et al. | 429/411 |
| 2002/0083646 A1 | 7/2002 | Deshpande et al. | |
| 2002/0088740 A1 | 7/2002 | Krause et al. | |
| 2002/0090327 A1 | 7/2002 | Deshpande | |
| 2002/0090328 A1 | 7/2002 | Deshpande | |
| 2002/0094310 A1 | 7/2002 | Krause et al. | |
| 2002/0155329 A1 | 10/2002 | Stevens | |
| 2003/0019363 A1 | 1/2003 | Grover et al. | |
| 2003/0021741 A1 | 1/2003 | Childress et al. | |
| 2003/0021742 A1 | 1/2003 | Krause et al. | |
| 2003/0044670 A1 | 3/2003 | Walsh | |
| 2004/0197240 A1 * | 10/2004 | Wheat et al. | 422/105 |

* cited by examiner

METHOD AND APPARATUS FOR SEPARATING LIQUID FROM A GAS STREAM

CROSS REFERENCE TO RELATED APPLICATION

This application is a continuation of co-pending U.S. application Ser. No. 10/408,035, filed on Apr. 4, 2003, herein incorporated by reference.

FIELD OF THE INVENTION

The present invention relates to fuel processing apparatus for converting hydrocarbon-based fuels into a hydrogen-enriched reformate for use by fuel cells or other devices requiring hydrogen-rich feed streams. The apparatus and methods of the present invention provide a compact apparatus for separating liquids from a gas stream such are found in fuel processing and/or fuel cell systems.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of these reactants.

A significant disadvantage which inhibits the wider use of fuel cells is the lack of a widespread hydrogen infrastructure. Hydrogen has a relatively low volumetric energy density and is more difficult to store and transport than hydrocarbon fuels currently used in most power generation systems. One way to overcome this difficulty is the use of reformers to convert a hydrocarbon fuel to a hydrogen rich gas stream that can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX) or combinations thereof. The clean-up processes are usually comprised of a combination of desulphurization, high temperature water-gas shift, low temperature water-gas shift, selective CO oxidation, selective CO methanation or combinations thereof. Alternative processes for recovering a purified hydrogen-rich reformate include the use of hydrogen selective membrane reactors and filters.

A fuel cell produces water as a product of the electrochemical reaction that occurs in a fuel cell stack. Hydrogen-rich reformate produced by fuel processors as feed for a fuel cell typically contains water in liquid and vapor phases as a result of the fuel reforming process. Efficient operation of a fuel cell-fuel processing system depends on the ability to provide effective water management in the system and specifically to control the recovery of water in the system.

It is desirable to continually recover fuel cell product water so that it can be used for other purposes within the fuel cell system such as to provide water to the fuel processor. It is also desirable to minimize the amount of liquid water in the various system streams so as not to detrimentally effect reactors supplied by such streams. For example, liquid water should be eliminated from the fuel cell exhaust gases that are supplied to the combustor so as not to drown the combustor catalyst, or otherwise suppress combustion of the exhaust gases therein. Similarly, it is desirable to insure that the hydrogen-rich reformate gas stream supplied to the fuel cell contain little or no liquid water that could either drown the catalyst or flood the fuel cell and thereby reduce its effectiveness. Water is recovered from such streams differently depending on its physical state. When in liquid form, the product water is typically recovered by a mechanical water separator, and when in the vapor state, it is typically recovered by a condenser.

The present invention relates to mechanical water separators to recover liquid water from various process gas streams found in fuel cell and/or fuel processing systems. The design of a mechanical liquid water separator presents a tradeoff between separating efficiency, gas flow pressure drop, and physical volume. The objective is to maximize separating efficiency, minimize gas flow pressure drop, and minimize physical volume of the component. Maximum separating efficiency is desired so that sufficient product water is recovered. Minimal pressure drop is desired to minimize the power requirements in the system, thus increasing overall system efficiency. Minimum physical volume is desired so that the component may be easily packaged in a fuel processor system or integrated fuel cell-fuel processing system.

SUMMARY OF THE INVENTION

The present invention provides an apparatus for separating water from a gas stream. The apparatus includes an elongated housing and a gas stream inlet on a side wall of the housing that is tangential to the side wall so as to cause the gas stream to swirl within the housing. A gas stream outlet is located in an upper portion of the housing and a liquid outlet is located below the gas stream inlet. The liquid outlet has a liquid outlet valve for maintaining a minimum level of liquid within the housing. The gas stream outlet is aligned on a first axis and the gas stream inlet is aligned on a second axis that is different from the first. Preferably, the gas stream outlet includes an elongated tubular extension that extends into the housing, the lower opening of the elongated tubular extension within the housing being located below the gas stream inlet. Optionally, at least of portion of the inner surface of the side wall of the housing is covered with a capillary material. In addition, the housing may optionally include a level indicator to monitor the liquid level within the housing.

Optionally, but preferably, the separator apparatus has a valve control system for the liquid outlet valve that is a passive control system. The passive control system preferably includes a float that directly controls a liquid outlet valve. More preferably still, the passive control system includes an electronic level switch that includes a float and a magnetic contactor connected to the float such that the magnetic contactor is moved between closed and open positions. The electronic level switch is preferably electrically connected in series to a solenoid that actuates the liquid outlet valve.

The present invention further provides a method for manufacturing an apparatus for removing liquid from a gas stream. The method includes the steps of providing an elongated housing having a cylindrical inner surface and providing a gas stream inlet on a side wall of the housing that is tangential to the side wall. The method further includes the step of providing a gas stream outlet in an upper portion of the housing above the gas stream inlet and providing a liquid outlet below the gas stream inlet, the liquid outlet having an associated liquid outlet valve for maintaining a minimum level of liquid within the housing.

In a further process aspect of the present invention, a method for separating liquid from a gas stream is provided.

The method includes the steps of directing a gas stream into an elongated housing, and causing the liquid within the gas stream to contact and adhere to an internal surface of the housing. The method further includes allowing the liquid-depleted gas stream to rise up through the housing to a gas stream outlet. Water adhering to the walls of the housing flows down the walls under the influence of gravity and is collected in a lower section of the housing. The method further includes the step of controlling the level of liquid in the lower section of the housing so that the liquid level does not drop below a predetermined level.

Optionally, but preferably, the water adheres to the internal surface(s) of the housing due to surface tension and capillary effect. Preferably, the elongated housing has a cylindrical side wall and the gas stream is directed into the housing along a path that is tangential to the cylindrical side wall so that the liquid within the gas stream contacts and adheres to the cylindrical side wall of the housing. In addition, it is preferred that the water-depleted gas is able to rise up through the elongated housing unimpeded. Further still, the step of controlling the level of liquid in the lower section of the housing is preferably achieved by draining liquid from the housing a float switch and solenoid to actuate the liquid outlet valve.

The present invention further provides a power generating apparatus including a fuel processor for producing a hydrogen-rich reformate gas stream comprising water, a first separator connected to the fuel processor for separating water from the hydrogen-rich reformate gas stream, a fuel cell connected with the separator for receiving a water-depleted hydrogen-rich reformate gas stream and producing electricity and an exhaust gas stream comprising water as products of an electrochemical reaction, and a second separator connected to the fuel cell for separating water from the fuel cell exhaust gas stream. The power generation apparatus further includes a combustor connected to the fuel processor and preferably the second separator is connected with the combustor for combusting a water-depleted fuel cell exhaust gas stream. At least one of the first and second separators in the power generating apparatus is a separator that includes an elongated housing, a gas stream inlet on a side wall of the housing that is tangential to the side wall so as to cause the gas stream to swirl within the housing, a gas stream outlet located in an upper portion of the housing and a liquid outlet located below the gas stream inlet that has a liquid outlet valve for maintaining a minimum level of liquid within the housing. Preferably, the separators direct the separated water to a common reservoir that provides water to the power generation apparatus and/or is connected to a domestic drain for disposal of excess water.

BRIEF DESCRIPTION OF THE FIGURES

The invention may be understood by reference to the following description taken in conjunction with the accompanying drawings.

FIG. 1-A is a side view of an apparatus of the present invention for separating a liquid from a gas stream.

FIG. 1-B is a top view of an apparatus of the present invention for separating a liquid from a gas stream.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover it will be appreciated that such a development effort might be complex and time-consuming, but would nevertheless be a routing undertaking for those of ordinary skill in the art having the benefit of this, disclosure.

The present invention provides (1) a separator apparatus for separating liquid from a gas stream, (2) a power generating apparatus that comprises at least one such separator, (3) a method for manufacturing an apparatus for removing liquid from a gas stream, and (4) a method for separating liquid from a gas stream.

(1) Apparatus for Separating Liquid from a Gas Stream

The present invention provides an apparatus for separating liquid from a gas stream, such as the separation of water from a fuel processing or fuel cell process gas stream. The gas stream may be at high pressure and/or high temperature. The liquid is efficiently removed from the gas stream with only a low pressure drop on the stream. Further, the apparatus is highly compact allowing its use in a number of fuel cell and/or fuel processing applications where space is commonly limited.

The gas-liquid separator of the present invention has an elongated housing having a cylindrical inner surface. As used herein, "cylindrical inner surface" does not require an inner surface that has perfect curvature, but rather can include a number of shapes including polygonal shapes having a number of straight segments, provided that the shape of the inner surface generally has sufficient curvature to cause the gas flow entering the housing to rapidly change velocity and direction so as to enable the liquid to separate from the gases in the stream.

Preferably, the housing is cylindrical in shape and has a vertical orientation. References to upper and lower portions of the elongated housing are made with this vertical orientation in mind. The cylindrical housing has a height and diameter in a ratio of between about 1.5:1 and about 3:1. Further the elongated housing should be compact having a height of less than about 24 inches, preferably less than about 18 inches, more preferably less than about 12 inches, and still more preferably less than about 10 inches. The housing will be manufactured from conventional materials such as metals, plastics and various composites.

The housing has a gas stream inlet for receiving a gas stream having a liquid component. The gas stream inlet is located on a side wall of the cylindrical housing. The gas stream inlet is positioned on the side wall so that its axis forms a geometric secant with the housing side wall. The gas stream entering the housing through this gas stream inlet flows along the cylindrical inner surface of the housing side wall. The flow path through this inlet, referred to herein as tangential, causes the gas stream to swirl within the housing and imposes centrifugal forces on the gas stream and its components. The liquid components of the gas stream contact the cylindrical inner surface and adhere to that surface due to surface tension. A capillary material optionally can be applied or coated on the cylindrical inner surface to promote adhesion of the liquid to that inner surface.

A gas stream outlet through which a liquid-depleted gas stream exits the housing is located in an upper portion of the elongated housing. The upper portion of elongated housing should be understood to refer to the upper half of the elongated housing. More preferably, the gas stream outlet is located on a portion of the housing above the center of the gas stream inlet.

To further improve the separation of liquid from the gas stream, it may be desirable to attach to the gas stream outlet a tubular extension that extends down into the interior of the housing. This tubular extension has unobstructed openings at opposite ends of the extension to allow a liquid-depleted gas stream to pass there through. This tubular extension should be long enough that the lower opening of the extension is positioned below the gas stream inlet. However, this lower end should not be so low that turbulence from the flow of liquid-depleted gas into the mouth of the extension tends to pick up liquid that is collected in the lower portion of the housing. In addition, the tubular extension should be oriented along an axis that is different from the axis of the gas stream inlet and from the swirling gas flow described above. More particularly, the tubular extension should be oriented so as to force the flow path of a liquid-depleted gas to turn and flow up and away from the lower portion of the housing. More preferably, the tubular extension should provide a flow path through the extension that is generally perpendicular to the tangential flow path of the gas stream entering the housing.

The housing further includes a liquid outlet below the gas stream inlet. This liquid outlet has a liquid outlet valve for draining liquid from the housing and for maintaining a minimum level of liquid within the elongated housing. Preferably, a valve control system is used to control and maintain the level of liquid within the lower portion of the housing. Although active control may be used, it is preferred that the valve control system be passive such that it does not require active monitoring or control on the part of a computer control system or human operator. In addition, when the separator is a component in a power generation apparatus, preferably, the valve control system will not impose a significant parasitic load on that power generation apparatus.

More specifically, the liquid outlet valve and valve control system will include a float valve that rises with the level of liquid collecting in the housing and thereby opening the valve. As the liquid drains and the liquid level drops, the valve is re-seated on the liquid outlet. The float and valve seat should be spaced apart so that the valve is reseated and sealed before all of the liquid has drained from the housing. The maintenance of a minimum level of liquid in the housing is needed to provide a water seal within the housing that will prevent gas from passing through the liquid outlet and minimize the pressure drop on the subject gas stream.

In a preferred embodiment, the valve control system comprises an electric level switch connected to a float. The float rises and falls with the liquid level within the lower portion of the housing. A magnetic contactor within the electric level switch is connected to the float and is moved between open and closed positions. A solenoid is electrically connected in series with the electronic level switch and controls the position of the liquid outlet valve in either an open or closed position. When the liquid level and float rise, the magnetic contactor in the level switch is moved to a closed position. The closure of this contactor results in a completion of the path to ground for the normally closed solenoid causing the solenoid to open the liquid outlet valve. When the liquid level allows the float to drop to a pre-selected level, the magnetic contactor is moved to an open position within the switch breaking the circuit and enabling the solenoid to return the liquid outlet valve to its normally closed position. Again, the pre-selected level will be a level at which there is sufficient water in the lower portion of the housing to provide a proper water seal above the liquid outlet.

Optionally, but preferably, the housing will further have a level indicator for monitoring the level of liquid within the lower portion of the housing. Preferably, the level indicator will be a level sight that is connected to the side wall of the elongated housing. Other level indicators are known in the art and may be used to advantage for this purpose.

Separated water leaving the housing through the liquid outlet may be directed to a process water tank for use in the associated fuel cell and/or fuel processing systems. Alternatively, the separated water may be directed to a reservoir from which the water can be directed to a domestic drain system. It should be noted that water separated from such fuel cell and fuel processing gas streams typically contains low levels of entrained or dissolved combustible gases. Such gases must be removed or reduced before the separated water can safely be disposed of through drainage. A method and apparatus for eliminating combustible gases from such water streams are disclosed in U.S. patent application Ser. No. 10/407,876 "Integrated Fuel Processor Apparatus and Enclosure and Methods of Using Same" to Wheat, et al., filed Apr. 4, 2003, the disclosure of which is incorporated herein by reference.

(2) A Power Generating Apparatus

The present invention further provides a power generation apparatus that includes a fuel processor, a fuel cell and two or more separators, wherein at least one of the separators is a gas-liquid separator apparatus of the present invention as described above.

Fuel Processor/Reformer

A power generation apparatus of the present invention will include a fuel processor for producing a hydrogen-rich reformate gas stream that comprises water. The fuel processor will be connected with a combustor, such as is described below, either directly or indirectly through one or more other components or subsystems.

Two different reactions are typically carried out in the reforming process. Formulas I and II are exemplary reaction formulas wherein methane is considered as the hydrocarbon.

$$CH_4 + \tfrac{1}{2}O_2 \rightarrow 2H_2 + CO \qquad (I)$$

$$CH_4 + H_2O \rightarrow 3H_2 + CO \qquad (II)$$

The partial oxidation reaction (formula I) occurs very quickly to the complete conversion of oxygen added and is exothermic (i.e., produces heat). A higher concentration of oxygen in the feed stream favors the partial oxidation reaction.

The steam reforming reaction (formula II), occurs slower and is endothermic (i.e., consumes heat). A higher concentration of water vapor favors steam reforming.

One of skill in the art should understand and appreciate that partial oxidation and steam reforming may be combined to convert pre-heated reformer reactants into a synthesis gas containing hydrogen and carbon monoxide. In such instances, the ratios of oxygen to hydrocarbon and water to hydrocarbon become characterizing parameters. These ratios affect the operating temperature and hydrogen yield. The operating temperature of the reforming step can range from about 550° C. to about 900° C., depending on the feed conditions and the catalyst.

The reformer uses a catalyst bed that may be in any form including pellets, spheres, extrudate, monoliths, and the like or wash coated onto the surface of fins or heat pipes. Partial oxidation catalysts should be well known to those with skill in the art and are often comprised of noble metals such as platinum, palladium, rhodium, and/or ruthenium on an alumina wash coat on a monolith, extrudate, pellet or other support. Non-noble metals such as nickel or cobalt have been used. Other wash coats such as titania, zirconia, silica, and magnesia have been cited in the literature. Many additional materials such as lanthanum, cerium, and potassium have been cited in the literature as "promoters" that improve the performance of the partial oxidation catalyst. Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

When the reforming process is primarily an autothermal reforming process, a cooling step is used to cool the reformate stream to a temperature of from about 600° C. to about 200° C., preferably from about 500° C. to about 300° C., and more preferably from about 425° C. to about 375° C., in preparation for various clean-up processes. This cooling may be achieved with heat sinks, heat pipes or heat exchangers depending upon the design specifications and the need to recover/recycle the heat content of the gas stream. Alternatively, or in addition thereto, cooling may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art. When the reforming process is intended to be primarily a steam reforming process, cooling of the synthesis gas is optional because of the endothermic nature of the steam reforming process.

A common impurity in the raw reformate stream is sulfur, which is converted by the reforming process to hydrogen sulfide. The reformer or a module downstream from the reformer can preferably include zinc oxide and/or other materials capable of absorbing and converting hydrogen sulfide and may include a support (e.g., monolith, extrudate, pellet etc.). Desulphurization is accomplished by converting the hydrogen sulfide to water in accordance with the following reaction formula III:

$$H_2S + ZnO \rightarrow H_2O + ZnS \quad (III)$$

Zinc oxide is preferred as it is an effective hydrogen sulfide absorbent over a wide range of temperatures from about 25° C. to about 700° C. and affords great flexibility for optimizing the sequence of processing steps by appropriate selection of operating temperature. Other impurities such as chlorides can also be removed.

The purified reformate stream may then be sent to an optional mixing step in which water is added to the gas stream. The addition of water lowers the temperature of the reactant stream as it vaporizes and supplies more water for the water gas shift reaction. The water vapor and other reformate stream components can be mixed by being passed through a processing core of inert materials such as ceramic beads or other similar materials that effectively mix and/or assist in the vaporization of the water. A typical water gas shift reaction converts carbon monoxide to carbon dioxide in accordance with formula IV:

$$H_2O + CO \rightarrow H_2 + CO_2 \quad (IV)$$

In this is process step, carbon monoxide, a poison to fuel cells, is substantially removed from the gas stream and is converted into carbon dioxide, which is generally considered an inert gas in fuel cells. The concentration of carbon monoxide should preferably be lowered to a level that can be tolerated by fuel cells, typically below about 50 ppm. Generally, the water gas shift reaction can take place at temperatures of from 150° C. to 600° C. depending on the catalyst used. Under such conditions, most of the carbon monoxide in the gas stream is oxidized to carbon dioxide.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. High temperature shift catalysts are preferably operated at temperatures ranging from about 300° to about 600° C. and can include transition metal oxides such as ferric oxide or chromic oxide, and optionally including a promoter such as copper or iron silicide. Other suitable high temperature shift catalysts are supported noble metals such as supported platinum, palladium and/or other platinum group members. The shift catalyst can also include a packed bed of high temperature or low temperature shift catalyst such as described above, or a combination of both high temperature and low temperature shift catalysts. Optionally, an element such as a heat pipe may be disposed in the processing core of the shift reactor to control the reaction temperature within the packed bed of catalyst as lower temperatures are favorable to the conversion of carbon monoxide to carbon dioxide.

In addition, selective oxidation can optionally be performed on the hydrogen-rich reformate to convert remaining carbon monoxide to carbon dioxide. Such reactions include: the desired oxidation of carbon monoxide (formula V) and the undesired oxidation of hydrogen (formula VI) as follows:

$$CO + \tfrac{1}{2}O_2 \rightarrow CO_2 \quad (V)$$

$$H_2 + \tfrac{1}{2}O_2 \rightarrow 4H_2O \quad (VI)$$

The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina wash coat. The wash coat may be applied to a monolith, extrudate, pellet or other support. Additional materials such as cerium or lanthanum may be added to improve performance. Many other formulations have been cited in the literature with some practitioners claiming superior performance from rhodium on alumina catalysts. Ruthenium, palladium, gold, and other materials have been cited in the literature as being active for this use as well.

The preferential oxidation of carbon monoxide is favored by low temperatures. Because both reactions produce heat, a heat pipe or other means can be disposed within the reactor to remove heat generated in the process. The operating temperature of process is preferably kept in the range of from about 90° C. to about 150° C. Again, such an oxidation process can be utilized to reduce the carbon monoxide level to less than 50 ppm, a level that is suitable for use in fuel cells.

The hydrogen-rich reformate exiting the fuel processor is a hydrogen rich gas containing carbon dioxide and other constituents such as water, inert components (e.g., nitrogen, argon), residual hydrocarbon, etc. This reformate can be used as the feed for a fuel cell or for other applications where a hydrogen-rich feed stream is desired.

Fuel reformers or processors are well known in the art for use in reforming or converting a hydrocarbon-based stream to a hydrogen-rich gas stream. Such reformers include but are not limited to those described in U.S. Patent Application Publication Nos.: US 2002/0083646 A1 to Deshpande, et al., published Jul. 4, 2002; US 2002/0090326 A1 to Deshpande, published Jul. 11, 2002; US 2002/0090328 A1 to Deshpande, published Jul. 11, 2002; US 2002/0090327 A1 to Deshpande, published Jul. 11, 2002; US 2002/0088740 A1 to Krause, et al., published Jul. 11, 2002; US 2002/0094310 A1, to Krause, et al., published Jul. 18, 2002; US 2002/0155329 A1 to Stevens, published Oct. 24, 2002; US 2003/00211741 A1 to Childress, et al., published Jan. 30, 2003; and US 2003/0021742 to Krause, et al., published Jan. 30, 2003; the disclosure of each of which is incorporated herein by reference. These publications disclose a number of differently configured fuel processors that may be used to advantage within the integrated apparatus of the present invention.

Fuel processors and reformers typically have an associated combustor that is either separate but connected to or directly integrated with the reforming reactor. The combustor is used for a variety of functions including the heating of reactants, the generation of steam, the heating of one or more reactors and/or catalyst beds, and the disposal of undesirable by-products that are generated during the operation of the fuel processor. For instance, such combustors are frequently referred to as tail gas oxidizers since they are commonly used to combust tail gas from the fuel cell stack in addition to their role in the fuel processing operation.

In the methods and apparatus of the present invention it is preferred that a combustor be utilized not only to aid in the fuel processing operation, but also for use in combusting and thereby eliminating combustible gases that are separated from various fuel processing and fuel cell process streams Suitable combustors can include those disclosed in U.S. Pat. No. 6,077,620, issued Jun. 20, 2000 to Pettit (catalytic combustor fired by anode effluent and/or fuel from a liquid fuel supply that has been vaporized); U.S. Pat. No. 6,232,005, issued May 15, 2001 to Pettit (a tubular section at the combustor's input end intimately mixes the anode and cathode effluents before they contact the combustors primary catalyst bed; the tubular section comprises at least one porous bed of mixing media that provides a tortuous path for creating turbulent flow and intimate mixing of the anode and cathode effluents therein); and U.S. Pat. No. 6,342,197, issued Jan. 29, 2002 to Senetar, et al. (describing and comparing combustors with a variety of features and configurations), the disclosures of which are incorporated herein by reference. Other suitable combustors include those described in U.S. patent application Ser. No. 10/408,080 "Method and Apparatus for Rapid Heating of Fuel Reforming Reactants" to Nguyen, filed Apr. 4, 2003, and in U.S. patent application Ser. No. 10/407,290 "Anode Tailgas Oxidizer" to Deshpande, et al., filed Apr. 4, 2003, the disclosures of which are incorporated herein by reference.

A number of other fuel processing subsystems are preferably integrated with the reformer and combustor. Such systems can include air handling, cooling and water management subsystems and may even be packaged or enclosed within a common enclosure with the fuel reformer and/or combustor. Suitable systems are disclosed in U.S. patent application Ser. No. 10/407,401, "Coolant System for Fuel Processor", Wheat, et al., filed Apr. 4, 2003; U.S. patent application Ser. No. 10/407,258, "Fluid Balance Control System for Use in a Fuel Processor", Nguyen, et al., filed Apr. 4, 2003; U.S. patent application Ser. No. 10/407,617, "Method and Apparatus for Separating Water From a Fuel Cell Exhaust Stream", Deshpande, et al., filed Apr. 4, 2003; and U.S. patent application Ser. No. 10/408,006, "Level Control for Process Water Tank", Wheat, et al., filed Apr. 4, 2003; and U.S. patent application Ser. No. 10/407,316, "Portable Fuel Processor Apparatus and Enclosure and Method of Installing Same", Wheat, et al., filed Apr. 4, 2003, the disclosures of each of which are incorporated herein by reference.

Fuel Cell Stack

A power generating apparatus of the present invention comprises at least one fuel cell and preferably a plurality of fuel cells commonly referred to as a stack.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \tag{1}$$

at the anode of the cell, and $$O_2 + 4H^+ + 4e^- \rightarrow 2H_2O \tag{2}$$

at the cathode of the cell.

A typical fuel cell has a terminal voltage of up to about one volt DC, For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDLs generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include NAFION™, GORE SELECT™, sulphonated fluorocarbon polymers, and other materials such as polybenzimidazole (PBI) and polyether ether ketone. Various suitable catalyst formulations are also known in the art, and are generally platinum-based.

Preferably, the power generating apparatus will have a plurality of fuel cells connected in series as a fuel cell stack. Fuel cell stacks also typically employ one or more manifolds for connecting common feed streams to the individual cells and for connecting the multiple anode and cathode exhaust outlets to one or more common exhaust streams. In the power generation apparatus of the present invention, the fuel cell or fuel cell stack has at least one exhaust stream outlet for connecting with the exhaust stream inlet of a process water tank. The exhaust stream preferably comprises a cathode exhaust stream but may also comprise an anode exhaust stream.

In addition, the fuel cells and fuel cell stacks used in the power generating apparatus of the present invention can also have an inlet for receiving a stream of water or other cooling fluid for circulating through the stack and controlling the temperature of the stack during the electrochemical reaction.

In a power generation apparatus of the present invention, the fuel cell is connected with a separator for receiving a water-depleted hydrogen-rich reformate gas stream and producing electricity and an exhaust stream comprising water as products of the electrochemical reaction.

Separator Apparatus

A power generating apparatus of the present invention will further include at least first and second separators for separating water from gas streams. At least one of the first and second separators will be a mechanical separator of the type of the present invention as is described in detail above. The other separator may also be a mechanical separator of the present invention but alternatively can be one of a number of different types of conventional gas-liquid separators. For instance, gas-liquid separators having filters and membranes for use in separating stream components are disclosed in U.S. Pat. No. 3,224,173, issued Dec. 21, 1965 to Webb; U.S. Pat. No. 5,989,318, issued Nov. 23, 1999 to Schroll; U.S. Pat. No. 6,376,113 issued Apr. 23, 2002 to Edlund, et al., and U.S. Pat. No. 6,228,146, issued May 8, 2001 to Kuespert. In addition, gas-liquid separators that utilize condensers and water traps to separate water from streams are disclosed in U.S. Pat. No. 4,037,024, issued Jul. 19, 1977 to Landau; U.S. Pat. No. 6,432,568, issued Aug. 13, 2002 to Salvador, et al.; U.S. Pat. No. 5,366,818, issued Nov. 22, 1994 to Wilkinson, et al.; and U.S. Patent Application Publication No. 2003/0044670 A1, published Mar. 6, 2003. The disclosure of each of these patents and patent publications is incorporated herein by reference.

In the power generation apparatus, the first separator is connected to the fuel processor upstream from the fuel cell for receiving a hydrogen-rich reformate that comprises water. The separator removes at least a portion of the water from the reformate stream leaving a water-depleted reformate. The water-depleted reformate is then directed from the first separator to the fuel cell where is it used as a feed for the electrochemical reaction that produces electricity, heat, and an exhaust gas stream comprising water. Downstream from the fuel cell is the second separator, which receives the fuel cell exhaust gas stream and separates at least a portion of the water from the exhaust stream resulting in a water-depleted exhaust stream. In an optional but highly preferred embodiment, the water-depleted exhaust stream is directed to the combustor associated with the fuel processor for combustion and disposal of the exhaust gases.

Preferably, the first and second separators will be connected to a common water reservoir for receiving the streams of separated water. Where additional separators are incorporated into a power generation apparatus, it is envisioned that the separated water from those separators will be combined in such a reservoir. Water collected in such a reservoir can be directed to a domestic drain or in the alternative can be recycled for use in the associated fuel cell and/or fuel processing system.

(3) A Method for Manufacturing an Apparatus for Removing Liquid from a Gas Stream The present invention further provides a method for manufacturing an apparatus for removing liquid from a gas stream. The method includes the steps of providing an elongated housing having a cylindrical inner surface and providing a gas stream inlet on a side wall of the housing that is tangential to the side wall. The method further includes the step of providing a gas stream outlet on an upper portion of the housing and providing a liquid outlet below the gas stream inlet, the liquid outlet having an associated liquid outlet valve for maintaining a minimum level of liquid within the housing.

(4) A Method for Separating Liquid from a Gas Stream

In a further process aspect of the present invention, a method for separating liquid from a gas stream is provided. The method includes the steps of directing a gas stream into an elongated housing, and causing the liquid within the gas stream to contact and adhere to an internal surface of the housing. Preferably, the water adheres to the internal surface(s) of the housing due to surface tension and capillary effects. The elongated housing preferably has a cylindrical side wall. The gas stream is directed into the housing along a path that is tangential to the cylindrical side wall so that the gas stream swirls within the housing causing the water within the gas stream contact and adhere to the cylindrical inner surface of the housing.

Water that adheres to the walls of the housing flows down the walls under the influence of gravity and is collected in a lower section of the housing. The method further includes the step of controlling the level of liquid in the lower section of the housing so that the liquid level does not drop below a predetermined level. The step of controlling the level of liquid in the lower section of the housing is preferably achieved by draining liquid from the housing a float valve, or more preferably, using a level switch to actuate a valve at a liquid outlet. A minimum level of liquid is maintained in the lower section of the housing so as to provide a liquid seal over a drain that is provided therein. This liquid seal causes the liquid-depleted gas stream to exit the housing through a gas stream outlet located in an upper portion of the housing. Further, the presence of a proper liquid seal will insure that there is only a small pressure drop on the gas stream as it passes through the housing and water is removed from the stream.

Thus, the method further includes the step of allowing a liquid-depleted gas stream to rise up through the housing to a gas stream outlet located in an upper portion of the housing. It is preferred that the liquid-depleted gas steam be allowed able to rise up through the elongated housing unimpeded. Many methods and devices are known where baffles, impellers and other internal structures are provided for separating the liquid component from the gas stream. However, the presence of such internal structures within a separator will disrupt gas flow and create undesirable pressure drop during liquid separation.

DETAILED DESCRIPTION OF THE FIGURES

Figure 1A:
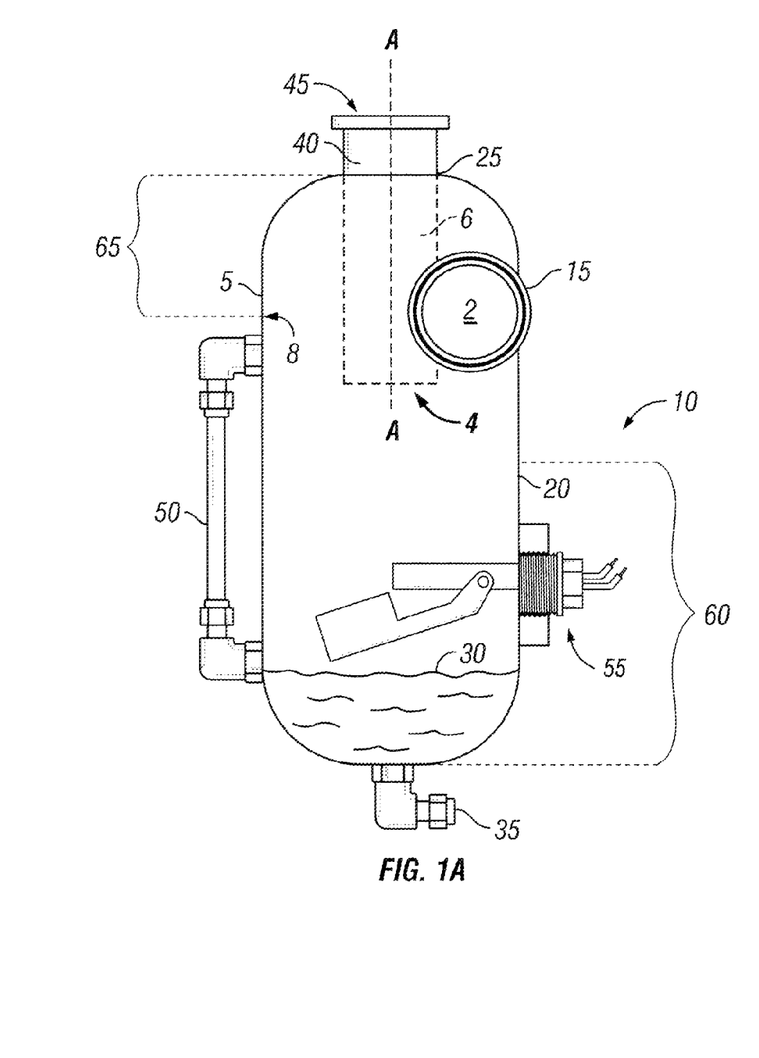
Figure 1B:
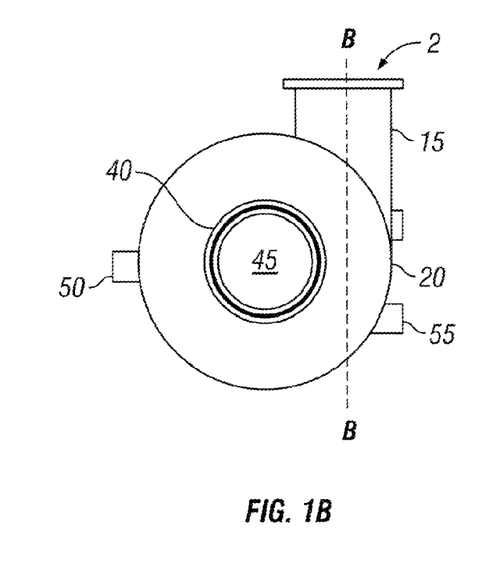

FIG. 1-A is a side view of separator 10 of the present invention. Separator 10 has elongated housing 5, lower section 60 and upper section 65, Inlet 15 with opening 2 is attached to side wall 20 of housing 5. As more clearly illustrated in FIG. 1-B, inlet 15 has an axis along line B-B that is tangential to side wall 20. By locating inlet 15 tangential to side wall 20, gas entering housing 5 is caused to change direction and flow along the inner surface of side wall 20. This swirling motion imposes centrifugal forces on the gas stream that cause the heavier liquid components to contact and adhere to side wall 20. To promote the adherence of liquid to side wall 20 a capillary material may be applied to inner surface 8 of housing 5. Water adhering to inner surface 8 flows down side wall 20 under the influence of gravity and collects in lower portion 60 of housing 5.

Liquid outlet 35 is provided in lower portion 60 of the housing for draining liquid from the housing. Level sight 50 is provided on the side wall to monitor the level of liquid within housing 5. Level switch 55, a float-type switch having a float shown in outline, is provided on side wall 20 of housing 5. The float within the housing rises and falls with the liquid level and controls the level switch position. Level switch 55 is connected in series with a solenoid (shown in FIG. 3) that actuates a liquid outlet valve in the drain line that is connected to liquid outlet 35. More specifically, when liquid level 30 rises, the float rises causing a magnetic contactor within level switch 55 to move to a closed position completing the circuit. The completion of the circuit causes the solenoid to actuate the liquid outlet valve from a normally closed position to an open position. As the liquid drains from housing 5 and liquid level 30 falls, the float drops moving the contactor within the switch to an open position breaking the electrical circuit. The breaking of this circuit causes the solenoid to return the valve to its normally closed position. Level switch 55 is shown in greater detail in FIG. 2.

Housing 5 has gas stream outlet 25 near its top through which the liquid-depleted gas stream exits the separator housing. Connected to outlet 25 is tubular extension 40 having section 6 that extends down into the interior of housing 5. Tubular extension 40 has opening 45 at it upper end extended from the outer surface of the housing and opening 4 provided at it lower end within the housing. The tubular extension should be of sufficient length that opening 4 is positioned below inlet 15 so as to improve separation efficiency. In addition, tubular extension 40 has an axis along line A-A that is generally perpendicular to the axis of inlet 15. As such, the axis of tubular extension and thus of outlet 25, is generally perpendicular to the flow path of the gas stream swirling within housing 5. This arrangement requires the liquid-depleted gas stream to make a near 90.degree. turn before rising up through the center of the housing and exiting the separator housing. Again, it is these changes in the gas stream flow path and velocity that contribute to the efficient separation.

Figure 2:
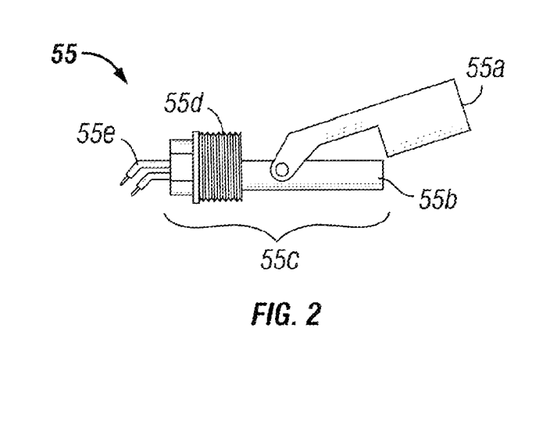
FIG. 2 is a side view of a float switch for use in the separator of the present invention.

FIG. 2 is a side view of the level switch 55. Switch 55 has float 55a, housing 55b that contains a magnetic contactor and the switch electronics, threads 55d for attaching to housing side wall 20 and insulated conductors 55e for electrically connecting the switch to a liquid outlet valve.

Figure 3:
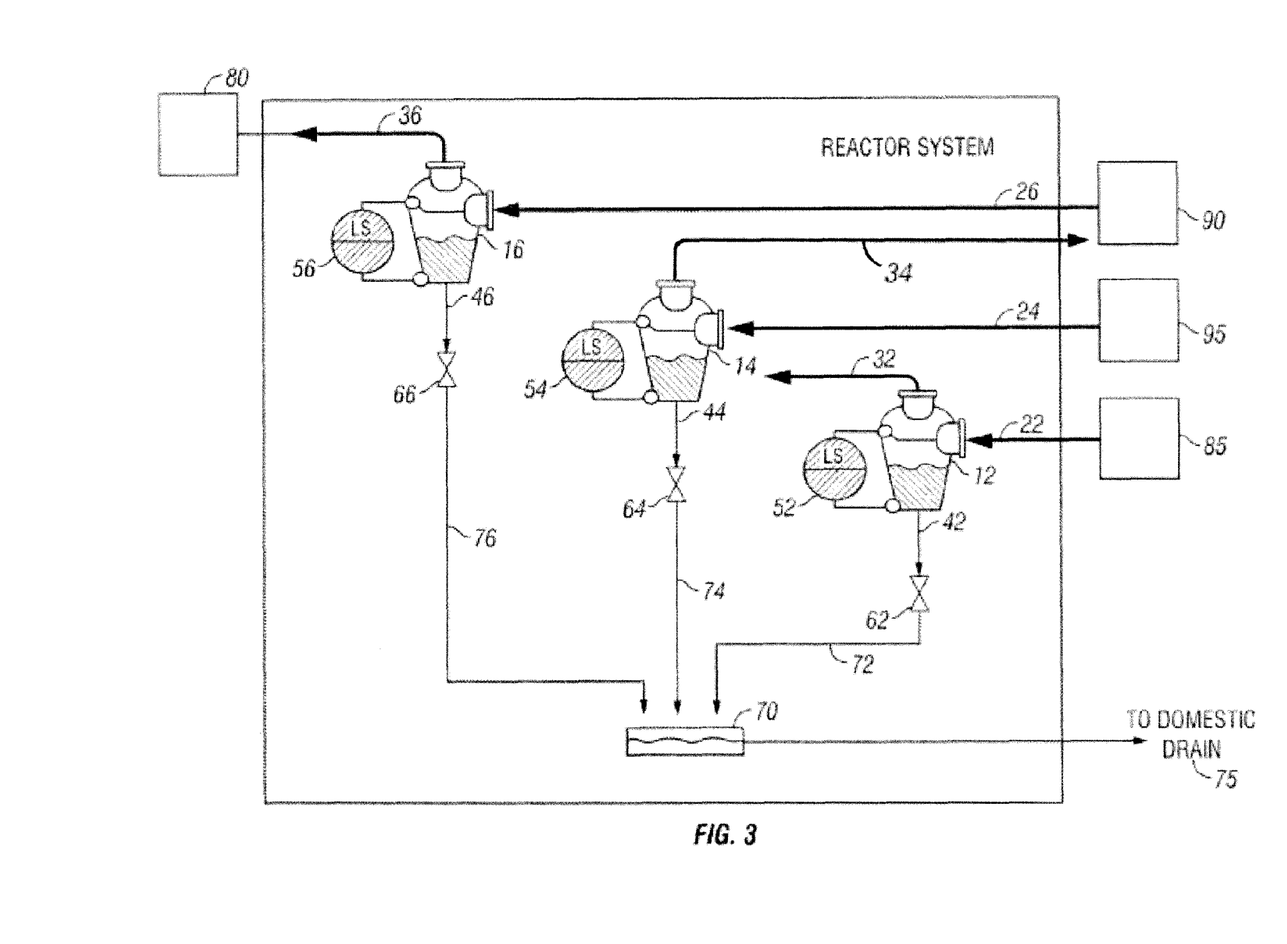
FIG. 3 is a schematic view of a reactor system comprising a plurality of separators according to the present invention.

FIG. 3 is a schematic of a power generating apparatus in accordance with the present invention. The apparatus shows fuel cell exhaust gas stream 26 being received by separator 16 from fuel cell stack 90. Within separator 16, liquids are separated from the gas stream leaving a liquid-depleted stream 36 that is directed to combustor 80. The separated water is collected in the lower portion of separator 16. Level switch 56 actuates liquid outlet valve 66 operated by a solenoid to allow the collected liquid to drain from the separator through line 46 and into line 76. When the liquid level drops to a pre-determined level, level switch 56 allows the normally closed solenoid to return to the liquid outlet valve to a closed position. Water drained through line 76 is directed to reservoir 70 that is connected to a domestic drain for disposal of the process water. In the alternative, where reservoir 70 is a process water tank, the water may be recycled for use in a fuel cell and/or fuel processing system (not shown).

Also shown in FIG. 3, is reformate stream 24 from fuel processor 95, The reformate is directed to separator 14 where water is separated from the reformate gas. The water-depleted stream 34 may then be directed to a fuel cell or to a combustor (not shown) depending on the content of the water depleted reformate. Level switch 54 actuates liquid outlet valve 64 operated by a solenoid to allow the collected liquid to drain from the separator through line 44 and into line 74. Where a power generation comprises a plurality of separators, of the same type or different, the separated water streams 72, 74 and 76 are preferably directed to common reservoir 70 for collective treatment and/or disposal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A power generating apparatus comprising:
a fuel processor for producing a hydrogen-rich reformate gas stream comprising water;
a first separator connected to said fuel processor for separating water from said hydrogen-rich reformate gas stream to produce a water-depleted hydrogen-rich gas stream and water that is not mixed with and does not contain gas;
a fuel cell connected to said first separator for receiving a water-depleted hydrogen-rich reformate gas stream and for producing electricity and an exhaust gas stream comprising water as products of an electrochemical reaction;
a second separator connected to said fuel cell for separating water from said exhaust gas stream; and
a combustor connected to said fuel processor and said second separator;
wherein at least one of said first separator and said second separator is a mechanical water separator comprising:
an elongated housing having a cylindrical inner surface wherein at least a portion of said cylindrical inner surface is covered with a capillary material;
a gas stream inlet aligned on a second axis wherein said gas stream inlet is tangential to side wall of said elongated housing causing entering gas stream to swirl within said elongated housing wherein liquid components of said entering gas stream separate due to centrifugal forces created by swirling flow path of said entering gas stream within said elongated housing;
a gas stream outlet located at upper portion of said elongated housing and aligned on a first axis wherein said gas stream outlet comprises an elongated tubular member that extends into said elongated housing wherein lower opening of said elongated tubular member within said elongated housing is located below said gas stream inlet;
a liquid outlet located below said gas stream inlet;
a liquid outlet valve for maintaining a minimum level of liquid within said elongated housing;

a level indicator to monitor liquid level within said elongated housing; and a valve control system for said liquid outlet valve wherein said valve control system is a passive control system.

2. The apparatus of claim 1 wherein said passive control system comprises a float.

3. The apparatus of claim 1 wherein said passive control system comprises an electronic level switch, said electronic level switch comprising a float and a magnetic contactor connected to said float, wherein said magnetic contactor is movable between open and closed positions.

4. The apparatus of claim 3 wherein said liquid outlet valve comprises a solenoid valve connected in series with said electronic level switch.

5. The apparatus of claim 1 wherein said first separator and said second separator are connected to a common separated water reservoir.

6. The apparatus of claim 5 wherein said common separated water reservoir provides water to said power generation apparatus.

7. The apparatus of claim 5 wherein said common separated water reservoir is connected to a domestic drain for disposal of excess water.

8. The apparatus of claim 1 wherein said elongated housing is cylindrical in shape and has a vertical orientation.

9. The apparatus of claim 8 wherein said elongated housing has a height to diameter ratio between about 1.5:1 and 3:1.

10. The apparatus of claim 8 wherein height of said elongated housing is less than 24 inches.

11. The apparatus of claim 1 wherein at least one of said first separator and said second separator lacks internal structures such that such that water-depleted gas stream rises through the housing unimpeded.

12. A power generating apparatus comprising:

a fuel processor for producing a hydrogen-rich reformate gas stream comprising water;

a first separator connected to said fuel processor for separating water from said hydrogen-rich reformate gas stream to produce a water-depleted hydrogen-rich gas stream and water that is not mixed with and does not contain gas;

a fuel cell connected to said first separator for receiving a water-depleted hydrogen-rich reformate gas stream and for producing electricity and an exhaust gas stream comprising water as products of an electrochemical reaction;

a second separator connected to said fuel cell for separating water from said exhaust gas stream; and a combustor connected to said fuel processor and said second separator wherein said first or said second separator has a capillary material applied to an inner surface.

13. The apparatus of claim 12 wherein said first separator and said second separator are connected to a common separated water reservoir.

14. The apparatus of claim 13 wherein said common separated water reservoir provides water to said power generation apparatus.

15. The apparatus of claim 13 wherein said common separated water reservoir is connected to a domestic drain for disposal of excess water.

* * * * *